United States Patent [19]

Sagar et al.

[11] Patent Number: 5,595,950
[45] Date of Patent: Jan. 21, 1997

[54] POLYMERIZATION CATALYST SYSTEMS, THEIR PRODUCTION AND USE

[75] Inventors: Vispi R. Sagar, League City; Moses O. Jejelowo, Kingwood, both of Tex.

[73] Assignee: Exxon Chemical Patents, Inc., Wilmington, Del.

[21] Appl. No.: 555,349

[22] Filed: Nov. 8, 1995

Related U.S. Application Data

[63] Continuation of Ser. No. 433,768, May 3, 1995, abandoned, which is a continuation of Ser. No. 170,108, Dec. 20, 1993, abandoned.

[51] Int. Cl.$^6$ ........................................................... C08F 4/02
[52] U.S. Cl. ........................ 502/104; 502/103; 502/152; 526/160; 526/943
[58] Field of Search ..................................... 502/103, 104, 502/152; 526/160, 943

[56] References Cited

U.S. PATENT DOCUMENTS 4,874,734  10/1989  Kioka et al. ............................ 502/104
4,960,878  10/1990  Crapo et al. ............................ 556/179

FOREIGN PATENT DOCUMENTS 279863  8/1988  European Pat. Off. .

*Primary Examiner*—David W. Wu
*Attorney, Agent, or Firm*—Jaimes Sher; C. Paige Schmidt

[57] ABSTRACT

This invention is generally directed toward a supported catalyst system useful for polymerizing olefins. The method for supporting the catalyst of the invention provides for a supported bulky ligand transition metal catalyst which when utilized in a polymerization process substantially reduces the reactor fouling and sheeting particularly in a gas phase polymerization process.

4 Claims, 1 Drawing Sheet

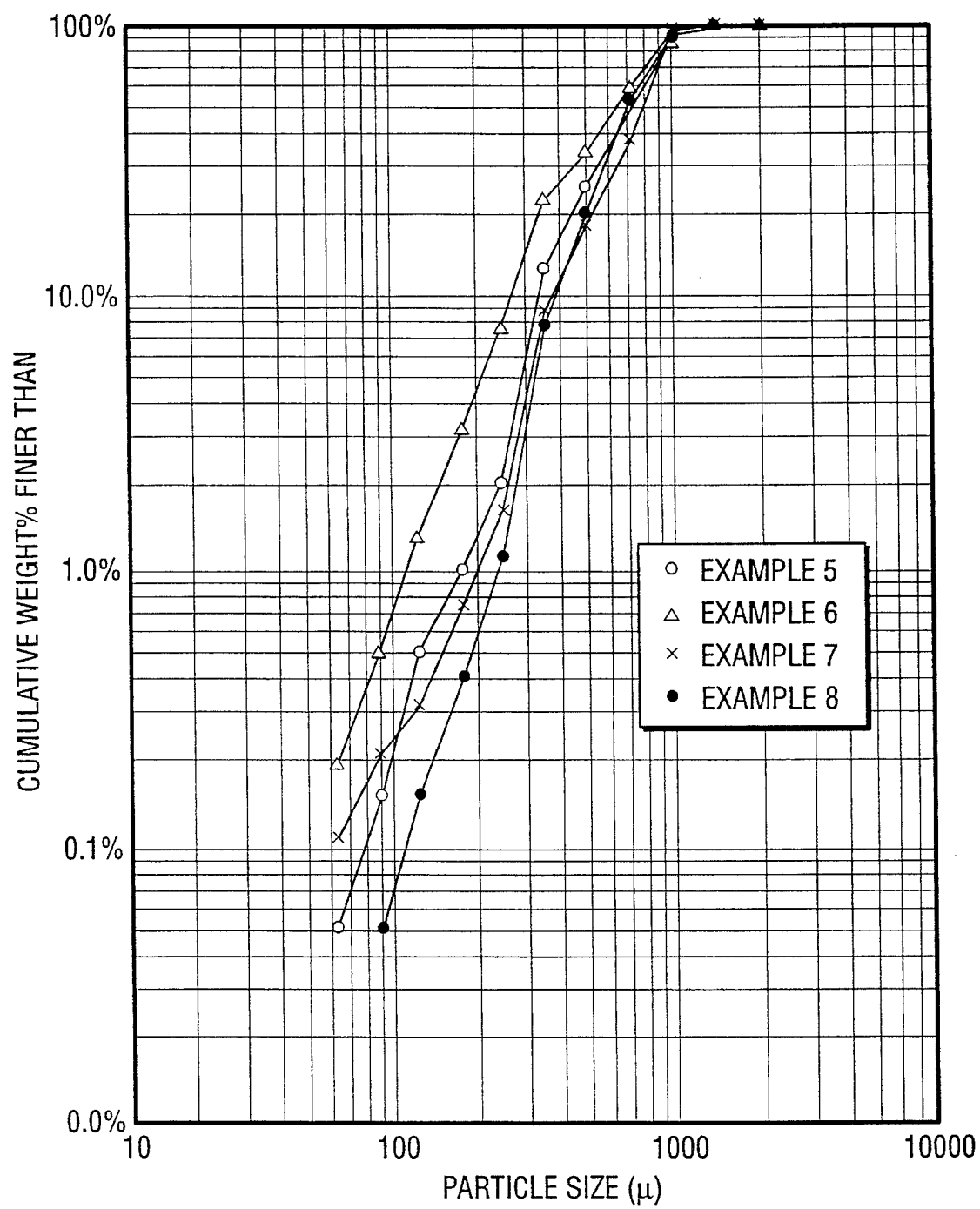

POLYMERIZATION CATALYST SYSTEMS, THEIR PRODUCTION AND USE

This is a continuation of application Ser. No. 08/433,768 filed on May 3, 1995 now abandoned which is R62 continuation of Ser. No. 08/170,108 filed Dec. 20, 1993 now abandoned.

FIELD OF THE INVENTION

This invention relates to catalysts, catalyst systems and to methods for their production and use in olefin polymerization. The invention particularly relates to a process for preparing a supported bulky ligand transition metal compound for use in the gas phase, slurry phase or liquid/solution phase with improved reactor operability.

BACKGROUND OF THE INVENTION

It is desirable in many polymerization processes, particularly a gas phase process, to use a supported catalyst. Generally these catalyst systems include a metallocene and alumoxane supported on the same carrier, such as silica, and subsequently dried to a powder. For example, U.S. Pat. No. 4,937,217 generally describes a mixture of trimethylaluminum and triethylaluminum added to an undehydrated silica then adding a metallocene to form a dry catalyst. EP-308177-B 1 generally describes adding a wet monomer to a reactor containing a metallocene, trialkylaluminum and undehydrated silica. U.S. Pat. Nos. 4,912,075, 4,935,937 and 4,937,301 generally relate to adding trimethylaluminum to an undehydrated silica and then adding a metallocene to form a dry supported catalyst. Similarly, U.S. Pat. Nos. 5,008,228, 5,086,025 and 5,147,949 generally describe forming a dry supported catalyst by the addition of trimethylaluminum to a water impregnated silica then adding the metallocene. U.S. Pat. No. 4,914,253 describes adding trimethylaluminum to undehydrated silica, adding a metallocene and then drying the catalyst with an amount of hydrogen to produce a polyethylene wax. U.S. Pat. Nos. 4,808,561, 4,897,455 and 4,701,432 describe techniques to form a supported catalyst where the inert carrier, typically silica, is calcined and contacted with a metallocene(s) and a activator/cocatalyst component. U.S. Pat. No. 5,238,892 describes forming a dry supported catalyst by mixing a metallocene with an alkyl aluminum then adding undehydrated silica. U.S. Pat. No, 5,240,894 generally pertains to forming a supported metallocene/alumoxane catalyst system by forming a metallocene/alumoxane reaction solution, adding a porous carrier, evaporating the resulting slurry to remove residual solvent from the carrier. Polymers produced using these catalyst systems can be difficult to process and more difficult to produce. Particularly in a gas phase polymerization process, using the catalyst systems described above polymers having multiple melting peaks are produced. These multiple melting peaks enhance the potential for sheeting or fouling during polymerization, which can result in reactor shut-down. Furthermore, variable melting peaks reduce polymer product consistency, limit product capability and adversely affect end-use applications properties such as clarity and heat sealability.

Also, during polymerization within a reactor, particularly gas phase polymerization process, there is a tendency for reactor fouling. Typically, in such a process, a continuous cycle is employed where in one part of the cycle, a recycle stream is heated in the reactor by the heat of polymerization. This heat is removed in another part of the cycle by a cooling system external to the reactor. During a typical polymerization process fines within the reactor often accumulate and cling or stick to the walls of a reactor. This phenomenon is often referred to as "sheeting". The accumulation of polymer particles on the reactor walls, the recycling lines and cooling system results in many problems including poor heat transfer in the polymerization process. Polymer particles that adhere to the walls of the reactor continue to polymerize and often fuse together and form chunks, which can be detrimental to a continuous process, particularly a fluidized bed process.

It would be highly desirable to have a polymerization catalyst that in a polymerization process would significantly enhance reactor operability and provide an improved polymer product.

BRIEF DESCRIPTION OF THE DRAWINGS

The foregoing assets, features and advantages of the invention will become clearer and more fully understood when the following detailed description is read in conjunction with the accompanying figure, in which:

FIG. 1 is a plot of particle size versus cumulative weight percent finer than illustrating the distribution of the polymer produced by the invention.

SUMMARY OF THE INVENTION

This invention is generally directed towards a new polymerization catalyst system, to methods for its manufacture and to its use in a polymerization process.

In one embodiment a method is provided to produce a supported bulky ligand transition metal catalyst system by contacting a porous carrier optionally with an organometallic compound, with at least one bulky ligand transition metal compound followed by the addition of a cocatalyst or activator that is hydrolyzed at least once after its initial formation.

In another embodiment of the invention, there is provided a process for producing polyolefins by contacting olefin monomer, optionally with comonomer in the presence of the catalyst system described above.

DETAILED DESCRIPTION OF THE INVENTION

Introduction

This invention is generally directed toward a supported catalyst system useful for polymerizing olefins. The method for forming the catalyst system of the invention involves for supporting a bulky ligand transition metal compound on a carrier followed by the addition of a cocatalyst or activator for the bulky compound that has been modified for example, by hydrolysis before use in the catalyst of the invention. For the purposes of this patent specification the phrase "hydrolyzing", "hydrolysis", and "hydrolyze" means that the activator or cocatalyst once formed by hydrolyzation or otherwise is subjected to hydrolysis before use in the catalyst system of this invention. Hydrolyzing the already formed cocatalyst or activator at least once results in a supported catalyst system with reduced tendency for sheeting or fouling a polymerization reactor. Also, the catalyst system of this invention results in a polymer product having improved physical properties, and in some instances with a substantial reduction in multiple melting peaks.

Catalyst Systems and Methods For Their Production

The catalyst is a bulky ligand transition metal compound. The bulky ligand contains a multiplicity of bonded atoms, preferably carbon atoms, forming a group which can be cyclic. The bulky ligand may be a cyclopentadienyl ligand or cyclopentadienyl derived ligand which can be mono- or poly-nuclear. One or more bulky ligands may be π-bonded to the transition metal atom. The transition metal atom may be a Group 4, 5 or 6 transition metal. Other ligands may be bonded to the transition metal, preferably detachable by a cocatalyst such as a hydrocarbyl or halogen leaving group. The catalyst is derivable from a compound of the formula $$[L]_m M[X]_n$$

wherein L is the bulky ligand; X is the leaving group, M is the transition metal and m and n are such that the total ligand valency corresponds to the transition metal valency. Preferably the catalyst is four co-ordinate such that the compound is ionizable to a $1^+$ valency state.

The ligands L and X may be bridged to each other and if two ligands L and/or X are present, they may be bridged. The metallocenes may be full-sandwich compounds having two ligands L which may be cyclopentadienyl ligands or cyclopentadiene derived ligands or half-sandwich compounds having one ligand L, which is a cyclopentadienyl ligand or derived ligand.

For the purposes of this patent specification the term "metallocene" is defined to contain one or more cyclopentadienyl moiety in combination with a transition metal. In one embodiment the metallocene catalyst component is represented by the general formula $(C_p)_m MeR_n R'_p$ wherein $C_p$ is a substituted or unsubstituted cyclopentadienyl ring; $M_e$ is a Group 4, 5 or 6 transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of Me.

In another embodiment the metallocene catalyst component is represented by the formulas:

$$(C_5R'_m)_p R''_s (C_5R'_m) MeQ_{3-p-x}$$

and $$R''_s (C_5R'_m)_2 MeQ'$$

wherein Me is a Group 4, 5, 6 transition metal, $C_5R'_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a $C_4$ to $C_6$ ring, R" is one or more of or a combination of a carbon, a germanium, a silicon, a phosphorous or a nitrogen atom containing radical substituting on and bridging two $(C_5R'_m)$ rings, or bridging one ($C_5R'm$) ring back to Me, when p=0 and x=1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, s is 0 or 1 and when s is 0, m is 5 and p is 0, 1 or 2 and when s is 1, m is 4 and p is 1.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and include alumoxane as the cocatalyst. None of these references disclose the catalyst system of this invention. There are a variety of methods for preparing alumoxane one of which is described in U.S. Pat. No. 4,665,208 incorporated herein by reference.

Further, the metallocene catalyst component can be a monocyclopentadienyl heteroatom containing compound. This heteroatom is activated by either an alumoxane or an alumoxane and an ionic activator to form an active polymerization catalyst system to produce polymers useful in this present invention. These types of catalyst systems are described in, for example, PCT International Publication WO 92/00333 published Jan. 9, 1992, U.S. Pat. Nos. 5,057, 475, 5,096,867, 5,055,438 and 5,227,440 and EP-A-0 420 436, WO 91/04257, all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr. 29, 1993 all of which are herein incorporated by reference. The preferred transition metal component of the catalyst of the invention are those of Group 4, particularly, zirconium, titanium and hafnium. The transition metal may be in any oxidation state, preferably +3 or +4 or a mixture thereof. All the catalyst systems of the invention may be, optionally, prepolymerized or used in conjunction with an additive or scavenging component to enhance catalytic productivity.

For the purposes of this patent specification, the terms "cocatalysts" and "activators" are used interchangeably and are defined to be any compound or component which can activate a bulky ligand transition metal compound or a metallocene, as defined above. In one embodiment the activators generally contain a metal of Group II and III. In the preferred embodiment the bulky transition metal compound are metallocenes, which are activated by trialkylaluminum compounds or alumoxanes or mixtures thereof. It is not beyond the scope of this invention to in addition to using the above activators to also use ionizing ionic activators or compounds such as tri(n-butyl) ammonium tetra(pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds are described in EP-A-0520 732, EP-A-0 277 003 and EP-A-0 277 004 published Aug. 3, 1988, and U.S. Pat. Nos. 5,153, 157, 5,198,401 and 5,241,025 are all herein fully incorporated by reference.

In the invention the cocatalyst or activator is hydrolyzed at least once after its formation. For example, as it is well established in the art the reaction of a trialkylaluminum compound and water, within or added to a support material or simply just added to the aluminum compound, results in a hydrolysis reaction to form a cocatalyst, alumoxane. Hydrolysis is a well known procedure in the art. Any of the procedures including but not limited to, for example, EP 03542, EP 108 339, EP 299 391, EP 315 234, EP 200 351, EP 328 348, and EP 360 492 can be used. The preferred method of hydrolysis is by bubbling wet nitrogen through a solution of the cocatalyst or activator.

In one embodiment the cocatalyst or activator of the invention is modified by a proton donor, for example, any compound containing an acidic hydrogen atom, such as water. In yet another embodiment the cocatalyst or activator of the invention is contacted with a Lewis acid or Lewis base such as for example, alcohols, silanols, ethers, nitriles and the like.

In one preferred embodiment the cocatalyst or activator is an oxy containing organometallic compound. In a more preferred embodiment the organometallic compound can be represented by the following formula:

which is a cyclic compound and

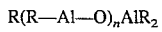

which is a linear or non-cyclic compound and mixtures thereof including multi-dimensional structures. In the general formula R is a $C_1$ to $C_{12}$ alkyl group such as for example methyl, ethyl, propyl, butyl, pentyl, hexyl, octyl, nonyl and n is an integer from about 1 to 20. The most preferred oxy containing organometallic compounds are alumoxanes, for example methyl alumoxane and/or ethylalumoxane. It is known in the art to make alumoxanes, see for example U.S. Pat. Nos. 4,530,914 and 4,952,716 incorporated herein by reference.

Typically when producing a cocatalyst or activator of the invention the cocatalyst or activator is typically formed from an organometallic compound. Once made the cocatalyst or activator comprises the cocatalyst or activator compound and some of the staging organometallic compounds from which the cocatalyst or activator was initially made and some inert solvent, such as toluene.

It has been discovered that by reducing the mole ratio of the cocatalyst or activator to the organometallic compound from which the cocatalyst or activator is made is beneficial to producing the catalyst of the invention. In one embodiment the initial cocatalyst or activator contains from about 20 wt % to about 80 wt % of the cocatalyst compound based on the total weight of the mixture of the cocatalyst compound, organometallic compound and inert solvent; more preferably from about 30 wt % to about 70 wt %, even more preferably from about 40 wt % to about 70 wt %, and most preferably from about 50 wt % to about 70 wt %. In another embodiment, the organometallic compound contained in the initial cocatalyst or activator mixture is in the range of about 20 wt % to about 80 wt %, more preferably in the range of about 30 wt % to about 70 wt %, even more preferably from about 30 wt % to about 60 wt %, and most preferably from about 30 wt % to about 50 wt %.

The organometallic compounds are from those compounds of Group 1, 2, 3 and 4 organometallic alkyls, alkoxides, and halides. The preferred organometallic compounds are lithium alkyls, magnesium alkyls, magnesium alkyl halides, aluminum alkyls, silicon alkyl, silicon alkoxides and silicon alkyl halides. The more preferred organometallic compounds are aluminum alkyls and magnesium alkyls. The most preferred organometallic compounds are aluminum alkyls, for example, triethylaluminum (TEAL), trimethylaluminum (TMAL), triisobutylaluminum (TIBAL) and tri-n-hexylaluminum (TNHAL) and the like. For example, where trimethylaluminum is being used to form methylalumoxane the resulting methylalumoxane mixture also contains some trimethylaluminum.

It has been discovered in one preferred embodiment that the amount of modification, preferably by hydrolyzation, of the cocatalyst or activator after its initial formation should satisfy the following expression:

HA/OM is equal to about 1.5 (A-0.08)

wherein A is the molar ratio of the organometallic compound to the total metal content of the cocatalyst or activator initially formed which would include both the cocatalyst or activator compound and the organometallic compound from which the cocatalyst or activator was formed; and HA is the number of moles of a hydrolyzing or modifying agent and OM is the number of moles of the starring organometallic compound remaining with the cocatalyst or activator after its initial formation. For the purposes of this patent specification the term "equal to about" in the above expression means that HA/OM is within 20 percent, preferably less than 10 percent, more preferably less than 5 percent of 1.5 (A-0.08).

In another embodiment the mole ratio of HA/OM is typically in the range of from about 0.05 to about 1.05, preferably in the range of about 0.07 to about 0.4 more preferably in the range of about 0.1 to about 0.3 and most preferably from about 0.1 to about 0.2.

In the preferred embodiment the cocatalyst or activator compound is methylalumoxane (MAO) which is made from TMAL where water ($H_2O$) is used as the hydrolyzing agent such that the mole ratio of $H_2O$/TMAL is in the range of about 0.05 to about 1.05, preferably about 0.06 to about 0.4 more preferably about 0.07 to about 0.3 and most preferably about 0.07 to about 0.2, where TMAL is the moles of TMAL remaining with MAO after its initial formation.

Typically when MAO is formed initially or purchased from a supplier it can contain gels. In one embodiment it is preferable that the cocatalyst or activator is "substantially free of gels." Gels can be removed by any method known in the art, for example, a filter can be used. It is also important to avoid gel formation when hydrolyzing the cocatalyst or activator of the invention. For the purposes of this patent specificatication "substantially free of gels" means that the cocatalyst or activator contains less than 20 weight percent of gels based on the total weight of the cocatalyst or activator less any solvents in the mixture, preferably less than 10 weight percent, more preferably less than 5 weight percent and most preferably less than 2 weight percent.

For purposes of this patent specification the term "carrier" or "support" can be any porous support such as talc, inorganic oxides, and resinous support materials such as polyolefin or polymeric compounds. Suitable inorganic oxide materials which are desirably employed include from the Periodic Table of Elements Groups 2, 3, 4, 5, 13 or 14 metal oxides. In a preferred embodiment, the catalyst support material include silica, alumina, silica-alumina, and mixtures thereof. Other inorganic oxides that may be employed either alone or in combination with the silica, alumina or silica-alumina are magnesia, titania, zirconia, and the like. Other suitable support materials can be employed such as, finely divided polyolefins, such as polyethylene or polymeric compounds and inorganic compounds such as magnesium dichloride and the like. The specific particle size of the support or inorganic oxide, surface area, pore volume, and number of hydroxyl groups are not critical to its utility in the practice of this invention. However, such characteristics determine the amount of support to be employed in preparing the catalyst compositions, as well as affecting the properties of polymers formed. The characteristics of the carrier or support must therefore be taken into consideration in choosing the same for use in the particular invention. In one embodiment the carrier is surface modified with surface modifying agents as described in U.S. Pat. No. 5,124,418 incorporated herein by reference.

In one embodiment of the invention the porous carrier is optionally contacted with an organometallic compound which can be the same or different from the compound used to initially form the cocatalyst or activator of the invention.

It is preferred that the carrier of the catalyst of this invention has a surface area in the range of from about 10 to about 700 m²/g, pore volume in the range of from about 0.1 to about 2.5 cc/g and average particle size in the range of from about 10 to about 500μ. More preferably, the surface area is in the range of from about 50 to about 500 m²/g, pore volume of from about 0.5 to about 2.0 cc/g and average particle size of from about 20 to about 200 μm. Most preferably the surface area range is from about 200 to about 400 m²/g, pore volume form about 0.8 to about 2.0 cc/g and average particle size is from about 30 to about 100 μm.

In one embodiment of the invention the metallocene catalyst of this invention can be used in combination with at least one other metallocene well known in the art to further control the properties of the polymer desired. It is preferred that a ratio of the catalyst of this invention to the other catalyst is preferably 1:19 to 19:1, more preferably 1:3 to 3:1, still more preferably 1:2 to 2:1 and most preferably 1:1.

Polymerization Process

The catalyst system of this invention is suited for the polymerization of monomers and optionally comonomers in any polymerization or prepolymerization process, gas, slurry or solution phase; even a high pressure autoclave process can be utilized. In the preferred embodiment a gas phase process is utilized.

In the preferred embodiment, this invention is directed toward the gas phase polymerization or copolymerization reactions involving the polymerization or optionally prepolymerization of one or more of the alpha-olefin monomers having from 2 to 20 carbon atoms, preferably 2–12 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1 and cyclic olefins such as styrene. Other monomers can include polar vinyl, dienes, norbornene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms. In another embodiment ethylene is polymerized with at least two comonomers to form a terpolymer and the like.

In one embodiment of the process of the invention, the olefin(s) are prepolymerized in the presence of the catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. No. 4,923,833 and 4,921,825 and EP-B-0279 863, published Oct. 14, 1992 all of which are incorporated fully herein by reference.

Typically in a gas phase polymerization process a continuous cycle is employed where in one part of the cycle, of a reactor, a cycling gas stream, otherwise known as a recycle stream or fluidizing medium, is heated in the reactor by the heat of polymerization. This heat is removed in another part of the cycle by a cooling system external to the reactor.

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

The catalyst is introduced into the reactor via a catalyst feeder mechanism either continuously or intermittently as is known in the art. Usually the catalyst is contained in a vessel with a mechanism for controlling the quantity of catalyst to be injected into the reactor. Typically the catalyst is introduced into the reactor with a gas such as nitrogen or can be introduced as a slurry in a inert volatile solvent. Many times these systems have multiple catalyst feeders and injection points for introducing catalyst into a reactor.

Using the catalyst of the invention results in a significant reduction in the amount of fines generated.

Typically with the catalyst of this invention, particularly where the porous carrier is silica, the percentage of fines less than about 250 μ are less than about 10 weight percent, more preferably about 4 weight percent and, even more preferably about 3 weight percent and most preferably less than about 1.5 weight percent. In one embodiment, the percentage of fines less than about 250μ is in the range of about 1.2 to about 1.9 weight percent.

Also, typically with the catalyst of this invention the percentage of fines less than about 125μ are less than about 2 weight percent, more preferably about 1 weight percent and, even more preferably about 0.5 weight percent and most preferably less than about 0.25 weight percent. In one embodiment, the percentage of fines less than about 125μ is in the range of about 0.05 to about 0.45 weight percent.

Further, typically with the catalyst of this invention the percentage of fines less than 63μ are less than about 0.5 weight percent, more preferably about 0.25 weight percent and, even more preferably about 0.15 weight percent and most preferably less than about 0.01 weight percent. In one embodiment, the percentage of fines less than about 63μ is in the range of about 0 to about 0.10 weight percent MWD, or polydispersity, is a well known characteristic of polymers. MWD is generally described as the ratio of the weight average molecular weight (Mw) to the number average molecular weight (Mn). The ratio Mw/Mn can be measured directly by gel permeation chromatography techniques, or indirectly, by measuring the ratio of $I_{21}$ to $I_2$ as described in ASTM D-1238-F and ASTM D-1238-E respectively. $I_2$ is well known in the art as equivalent to Melt Index (MI). $I_{21}$ is also known as high load melt index (HLMI). MI is inversely proportional to the molecular weight of the polymer (Mw). The MI of the polymers of the invention are generally in the range of about 0.1 dg/min to about 1000 dg/min, preferably about 0.2 dg/min to about 300 dg/min, more preferably about 0.3 to about 200 dg/min and most preferably about 0.5 dg/min to about 100 dg/min.

The ratio of $I_{21}/I_2$ is known as the melt index ratio (MIR) and for the purposes of this patent specification the ratio is also defined to be melt flow ratio (MFR). MIR is generally proportional to the MWD.

The MIR of the polymers of this invention are generally in the range of greater than 14 to about 200, preferably about 18 to 60 and most preferably about 22 to about 45.

Typically polymers made in the past, for example, traditional Ziegler-Natta catalyzed polymers, contain a high density component (or, high melting temperature component) in the range of about 8.8 to 13.5 weight percent or higher. The presence of this high density component in the polymer can be detrimental to the physical attributes, such as haze, gloss and heat seal initiation temperature of a film made from such a polymer. The polymers of the invention contain less than 7 weight percent of the high density component, more preferably less than 6.5 weight percent, even more preferably less than 6 weight percent, and most preferably less than 5.3 weight percent.

In some instances where it is necessary to improve processability and manipulate final end product characteristics the polymers produced by this present invention can be blended or coextruded into single or multilayer films or the like with various other polymers well known in the art, for instance, LLDPE, LDPE, HDPE, PP, PB, EVA and the like. The polymers produced by the process of the invention are useful in such forming operations include film, sheet, and fiber extrusion and co-extrusion as well as blow molding, injection molding and roto molding. Films include blown or cast films in mono-layer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages and limitations thereof, the following examples are offered.

Density is measured in accordance with ASTM-D-1238. The ratio of Mw/Mn can be measured directly by gel permeation chromatography techniques.

For the purposes of this patent specification the MWD of a polymer is determined with a Waters Gel Permeation Chromatograph equipped with Ultrastyrogel columns and a refractive index detector. In this development, the operating temperatures of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

Standard method for particle size distribution analysis, including measurement of fines was performed in accordance with ASTM-D-1921.

Comparative Example 1

This catalyst was prepared by first reacting undehydrated Davison 948 silica, having about 10 wt- % LOI, with trimethyl aluminum such that the molar ratio (TMA:$H_2O$) is about 1:1, and then reacting the reaction product of such treated support material with (1,3-Me$^n$BuCp)$_2$ZrCl$_2$ and then drying the catalyst formed to a free-flowing powder for use in a gas-phase reactor. The catalyst of this example has an Al loading of about 16 wt- % and Zr loading of about 0.4 wt- %.

0.35 g sample of TMA-treated silica was added into a catalyst holding tube as a bottom layer of treated silica, to this was added 0.2 g of the silica-supported catalyst described above, then a second layer of 0.35 g of TMA-treated silica was added as a top layer such that the silica-supported metallocene was sandwiched between two layers of TMA-treated silica. This catalyst holding tube was, meanwhile, clamped in place such that no shaking took place. This catalyst setup was then introduced into a semi-batch gas-phase reactor under a $N_2$ pressure. A feed of 1-butene in ethylene was then introduced into the reactor at 85° C. The pressure in the reactor was held constant by continuously feeding 5 mol- % 1-butene in ethylene to compensate for any pressure change due to polymerization. After 1 h, the polymer formed was separated from the seed bed material and analyzed for resin molecular properties and the results are shown in Table 1. The resulting polymer contained some chips and shreds of fused polymer.

Comparative Example 2

This catalyst was prepared by first reacting Davison 948 silica that had been dehydrated to 200° C. with preformed methylalumoxane and then reacting the reaction product of the treated support material with (1,3-Me$^n$BuCp)$_2$ZrCl$_2$; and then drying the catalyst formed to a free-flowing powder for use in a gas-phase reactor. The catalyst of this example has an Al loading of about 12 wt- % and Zr loading of about 0.4 5 wt- %.

The catalyst was then tested in a manner similar to that described in Example 1. After 1 h, the polymer formed was separated from the seed bed material and analyzed for resin molecular properties and the results are shown in Table 1.

Comparative Example 3

383 g of Davison 948 silica that had been dehydrated to 200° C. was weighed into a 5-liter reaction flask and 2000 cm$^3$ nitrogen sparged heptane was added to slurry the silica. The flask was immersed in an ice-water bath maintained at 5° C. Then 475 cm$^3$ of a 15 wt- % TMA in heptane was added. After 1 h, the ice-water bath was replaced with a warmer water bath at 25° C. and a solution of 8.38 g (1,3-Me$^n$BuCp)$_2$ZrCl$_2$ in 225 cm$^3$ toluene was added with the temperature still at 25° C. After 2 h, 260 cm$^3$ of a 30 wt- % methylalumoxane (MAO) in toluene was added. The temperature was then raised to 70° C. and maintained for 2 h. The catalyst was then dried to free-flowing powder under vacuum. This catalyst has an Al loading of 6.5 wt- % and Zr loading of 0.35 wt- %.

The catalyst was then tested in a manner similar to that described in Example 1 except that the amount of catalyst used was 0.15 g. After 1 h, the polymer formed was separated from the seed bed material and analyzed for resin molecular properties and the results are shown in Table 1.

Example 4

In a 5-liter flask, 1000 cm$^3$ of filtered 10 wt- % MAO solution in toluene corresponding to 53 g MAO was added to 1800 cm$^3$ freshly distilled toluene. The flask was immersed in hot water bath at 60° C. and agitated mechanically. Hydrolysis was then performed by bubbling nitrogen slowly through 4 cm$^3$ deionized water and through a dip-tube inside the MAO solution until all the water was completely used up. It is preferred that the hydrolysis take place as near as possible to the time when the catalyst system of the invention is being made.

278 g of Davison 948 silica that had been dehydrated to 200° C. was weighed into a separate 5-liter reaction flask and 1500 cm$^3$ nitrogen sparged heptane was added to slurry the silica. The flask was immersed in an ice-water bath maintained at 5° C. Then 345 cm$^3$ of a 15 wt-% TMA in heptane was added. After ½ h, the ice-water bath was replaced with a warmer water bath at 25° C. The reaction medium was allowed to equilibrate at this temperature for 1 h and then a solution of 6.1 g (1,3-Me$^n$BuCp)$_2$ZrCl$_2$ in 200 cm$^3$ toluene was added with the temperature still at 25° C. After 2 h, the solution of treated MAO from above was then added. The temperature was raised to 70° C. and maintained for 2 h. The catalyst was then dried to free-flowing powder under vacuum. This catalyst has an Al loading of 6.5 wt-% and Zr loading of 0.35 wt-%.

The catalyst was then tested in a manner similar to that described in Example 1. After 1 h, the polymer formed was separated from the seed bed material and analyzed for resin molecular properties and the results are shown in Table 1.

TABLE 1

| Example | Yield (g) | Normalized[1] Catalyst Activity | Density g/cc | $I_{2.1}$ | $I_{21}/I_{2.1}$ |
|---|---|---|---|---|---|
| C-1 | 107 | 1115 | 0.9157 | 0.85 | 20.0 |
| C-2 | 258 | 1444 | 0.9112 | 0.77 | 18.9 |
| C-3 | 180 | 1395 | 0.9117 | 0.98 | 20.9 |
| 4 | 228 | 1527 | 0.9114 | 1.05 | 19.5 |

[1]gPE/(gCAT · h · 150 psi)

Comparative Examples 5–7 and Example 8

The catalysts described in Comparative Examples 1–3 and Example 4 above were then tested in a pilot plant, the results of which are illustrated in Table 2 as Comparative Examples 5–7 and Example 8 respectively. The catalyst was fed continuously into a fluid bed gas-phase pilot plant reactor (internal diameter of 16¼ inches (41 cm)) maintained at 165° F. (74° C.) and 300 psig (2171 kPa) total pressure. The product was withdrawn continuously through a product discharge outlet to maintain a constant bed height in the reactor. The composition of the gas phase, and operating conditions for the reactor are as follows:

TABLE 2

| | Example | | | |
|---|---|---|---|---|
| | C-5 | C-6 | C-7 | 8 |
| Ethylene (mole %) | 35.0 | 34.8 | 34.9 | 35.0 |
| 1-Butene (mole %) | 1.0 | 1.01 | 1.03 | 1.0 |
| 1-Hexene (mole %) | 0.65 | 0.636 | 0.63 | 0.66 |
| Hydrogen (ppm) | 126 | 118 | 120 | 120 |
| Nitrogen | balance | balance | balance | balance |
| Catalyst Used | C-1 | C-2 | C-3 | 4 |
| Catalyst feed (g/h) | 4.81 | 5.19 | 5.25 | 8.27 |
| Catalyst Productivity (lb/lb) (g/g) | 3465 | 3210 | 2575 | 2914 |
| 1% tri-iso-Butyl feed (cc/hr) | 210 | 335 | 260 | 260 |
| Production Rate (lbs/hr) | 38.9 | 36.7 | 34.3 | 40.7 |
| Production Rate (kg/hr) | 17.6 | 16.6 | 15.6 | 18.5 |
| Reaction Temperature (°F.) | 165 | 165 | 165 | 165 |
| Reaction Temperature (°C.) | 74 | 74 | 74 | 74 |
| Bed Weight (lbs) | 238 | 238 | 238 | 238 |
| Bed Weight (kg) | 108 | 108 | 108 | 108 |
| Residence Time (hrs) | 6.12 | 6.49 | 6.94 | 5.85 |
| Gas Velocity (ft/s) | 1.55 | 1.5 | 1.58 | 1.55 |
| Gas Velocity (m/s) | 0.47 | 0.46 | 0.48 | 0.47 |

TABLE 2-continued

| | Example | | | |
|---|---|---|---|---|
| | C-5 | C-6 | C-7 | 8 |
| Bed Height/Diameter Ratio | 5.7 | 6.3 | 6.1 | 6.0 |

The polymerization of ethylene with the mixture of butene and hexene produced a terpolymer wherein the total comonomers were in the weight ratio of 75:25 (Hexene:Butene). The product properties and fines data are summarized in Table 3. The fines data show below illustrate the extent to which particle attrition, or break-up has been minimized. The examples noted here were demonstrated at steady state operation with a minimum of five bed turnovers.

TABLE 3

| | Example | | | |
|---|---|---|---|---|
| | C-5 | C-6 | C-7 | 8 |
| MI | 2.54 | 2.45 | 2.09 | 2.55 |
| Density (g/cm$^3$) | 0.9051 | 0.909 | 0.9083 | 0.9054 |
| Bulk density (g/cm$^3$) | 0.479 | 0.429 | 0.443 | 0.450 |
| APS (μ) | 695 | 652 | 710 | 702 |
| COV | 0.40 | 0.50 | 0.41 | 0.37 |
| wt. % Fines <250μ | 2.10 | 7.70 | 1.65 | 1.10 |
| wt. % Fines <125μ | 0.50 | 1.34 | 0.30 | 0.10 |
| wt. % Fines <63μ | 0.05 | 0.20 | 0.10 | 0.00 |

The improvement in the fouling characteristics can be quantified in terms of the reduced rate of increase in pressure drop of the gases flowing through the heat exchanger, and the distributor plate recorded during these tests. Typically the distributor plate is located within the reactor but below the reaction zone in a reactor. The recycle stream upon entering the reactor typically passes through a distributor plate. More information can be found in the disclosure of U.S. Pat. No. 4,543,399 incorporated herein by reference.

Products that contain a high level of fines will permit the entrainment of these fines (containing in many instances active catalyst) out of the fluidized bed and into the recycle gas stream outside of the reactor. These fines will attach themselves to critical parts of the recycle system, such as the heat exchanger, or, the distributor plate. Once attached, they will continue to polymerize. The buildup of polymer in the heat exchanger, and the distributor plate will increase the pressure drop for the gases flowing through them, an undesirable effect.

The lower level of fines in the product made by this invention (Example 8 in Table 3) will result in fewer fines being entrained out of the reactor and also in the reactor allowing for a significantly longer periods for a stable operating process with minimal or substantially no fouling. The reduction in the rate of fouling is evidenced by the low pressure drop data as shown in Table 4.

TABLE 4

| | Example | | | |
|---|---|---|---|---|
| | C-5 | C-6 | C-7 | 8 |
| Heat Exchanger Pressure drop increase (lbs/sq. inch) [Kg/cm$^3$ 1] | (0.06) [0.004] | (0.01) [0.0007] | (0.02) [0.001] | (0.01) [0.0007] |

TABLE 4-continued

|  | Example | | | |
|---|---|---|---|---|
|  | C-5 | C-6 | C-7 | 8 |
| Distributor Plate Pressure drop increase (inches of water) [cm of water] | (2.9) [7.4] | (0.6) [1.5] | (2.0) [5.1] | (0.1) [0.254] |

The improvement in the particle size distribution is illustrated in FIG. 1. For example, it can be seen from FIG. 1 that in the case of comparative example 6, the cumulative weight fraction of the product that is finer than 100µ is about 0.7 weight percent. In Example 8 of the invention, the cumulative weight fraction of the product finer than 100µ is only 0.07 weight percent.

While the present invention has been described and illustrated by reference to particular embodiments, it will be appreciated by those of ordinary skill in the art that the inventions lends itself to variations not necessarily illustrated herein. For example, it is not beyond the scope of this invention to mix at least two of the catalysts of the invention or to use the catalyst of the invention with any other catalyst or catalyst system known in the art, for example a traditional Ziegler-Natta catalyst or catalyst system. Also, the catalyst of the invention is useful in slurry, solution, gas phase and high pressure polymerization processes or mixtures thereof. For this reason, then, reference should be made solely to the appended claims for purposes of determining the true scope of the present invention.

We claim:

1. A method for producing a supported catalyst system, said method comprising the steps of:

(1) contacting a porous carrier with at least one metallocene; and (2) adding alumoxane that, after its initial formation, has been hydrolyzed with a hydrolyzing agent without the prior addition of alkylaluminum.

2. The method of claim 1 wherein the alumoxane has been hydrolyzed in an amount such that the following equation is satisfied:

$$HA/OM \text{ is equal to about } 1.5 (A-0.08)$$

wherein A is the molar ratio of alkylaluminum from which the alumoxane is initially formed to the total metal content of the alumoxane initially formed which would include unreacted alkylaluminum; HA is the number of moles of hydrolyzing agent and OM is the number of moles of alkylaluminum remaining after initial formation of alumoxane.

3. The method of claim 1 wherein the alumoxane is methylalumoxane.

4. The method of claim 1 wherein the hydrolyzing agent is water.

* * * * *